(12) United States Patent  
Hung

(10) Patent No.: US 9,083,866 B2  
(45) Date of Patent: Jul. 14, 2015

(54) NETWORK CAMERA

(71) Applicant: Sercomm Corporation, Tapei (TW)

(72) Inventor: Sung-Chun Hung, Taipei (TW)

(73) Assignee: SERCOMM CORPORATION, Tapei (TW)

( * ) Notice: Subject to any disclaimer, the term of this patent is extended or adjusted under 35 U.S.C. 154(b) by 16 days.

(21) Appl. No.: 13/961,933

(22) Filed: Aug. 8, 2013

(65) Prior Publication Data

US 2014/0160303 A1   Jun. 12, 2014

(30) Foreign Application Priority Data

Dec. 7, 2012   (CN) .......................... 2012 2 0672598

(51) Int. Cl.
*H04N 5/225* (2006.01)
*G03B 17/02* (2006.01)
*G03B 17/56* (2006.01)

(52) U.S. Cl.
CPC .............. *H04N 5/2251* (2013.01); *G03B 17/02* (2013.01); *G03B 17/561* (2013.01)

(58) Field of Classification Search
CPC ..... H04N 5/225; H04N 5/2251; G03B 17/02; G03B 17/561
USPC .................................. 348/81, 373–376, 207.1
See application file for complete search history.

(56) References Cited

U.S. PATENT DOCUMENTS 5,801,917 A * 9/1998 Elias .............................. 361/535
7,871,205 B2 * 1/2011 Inoue ............................ 396/422

* cited by examiner

*Primary Examiner* — Yogesh Aggarwal
(74) *Attorney, Agent, or Firm* — McClure, Qualey & Rodack, LLP

(57) ABSTRACT

A network camera comprises a base, a casing and a fasten element. The base has a screw hole. The casing has a through hole. The fasten element passes through the through hole to be fastened within the screw hole, so as to fix a relative position between the base and the casing.

15 Claims, 2 Drawing Sheets

NETWORK CAMERA

This application claims the benefit of People's Republic of China application Serial No. 201220672598.5, filed on Dec. 7, 2012, the subject matter of which is incorporated herein by reference.

BACKGROUND OF THE INVENTION

1. Field of the Invention

The invention relates in general to a network camera, and more particularly to a network camera resolving a problem that an embedded nut may become loose.

2. Description of the Related Art

Conventional network camera requires a nut embedded within a casing of the network camera, and then a joint of a base is screwed to the nut to be fixed to the casing. In the process of forming the casing, the nut is disposed within a cavity of a mold, and then injects the cavity with a casing material, such that the nut is embedded in the casing. However, such process frequently results in a poor combination between the nut and the casing, and thus the nut may become loose and rotate when the joint of the base is screwed to the nut.

SUMMARY OF THE INVENTION

The invention is directed to a network camera, in an embodiment, under the circumstances of omitting an embedded nut, a joint of a base can be screwed to the casing, and accordingly resolve a problem that the embedded nut may become loose.

According to one embodiment of the present invention, a network camera is provided. The network camera comprises a base, a casing and a fasten element. The base has a screw hole. The casing has a through hole. The fasten element passes through the through hole to be fastened within the screw hole, so as to fix a relative position between the base and the casing.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
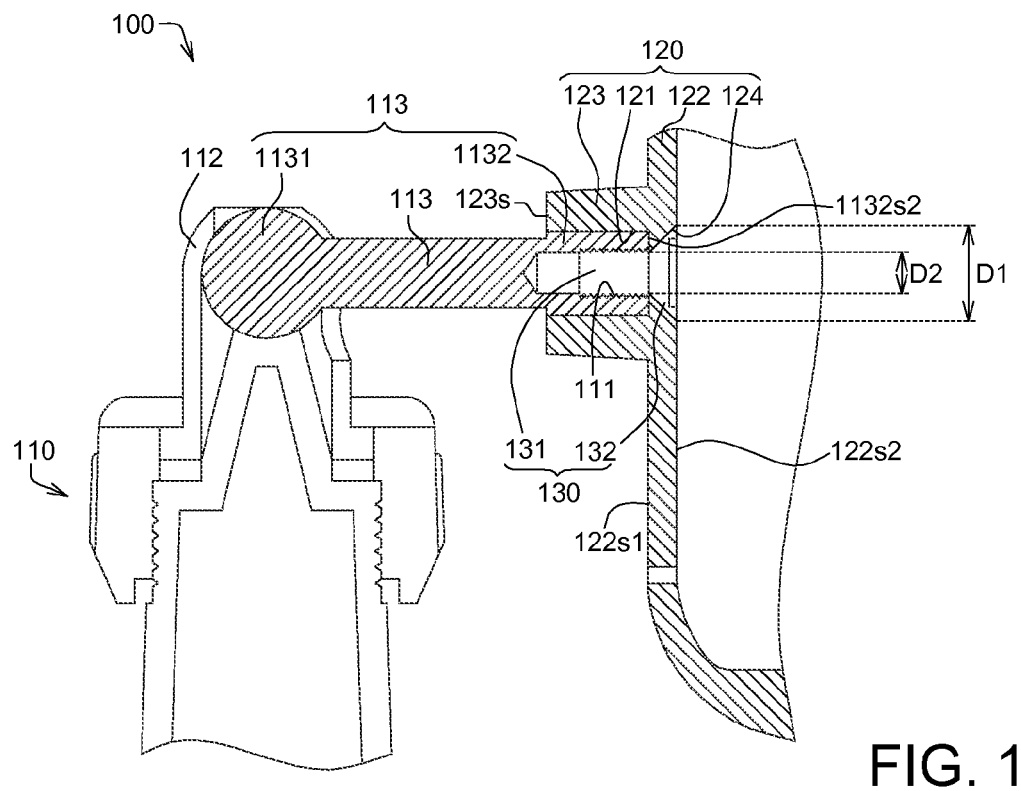
FIG. 1 illustrates a cross-sectional view of a network camera according to an embodiment of the invention.

Referring to FIG. 1, a cross-sectional view of a network camera according to an embodiment of the invention is illustrated. The network camera 100 comprises a base 110, a casing 120 and a fasten element 130. Although not illustrated, the network camera 100 further comprises an image capture element and a printed circuit board (PCB) disposed within the casing 120, wherein the PCB is used for controlling the image capture element to capture (take a picture or take a dynamic photography) an image.

The base 110 has am inner screw hole 111 and comprises a seat 112 and a joint rod 113. The seat 112 is disposed on a computer, a wall or other environment which requires being monitored. The joint rod 113, such as a universal joint, comprises a joint end 1131 and a screw end 1132. The joint end 1131, such as a ball joint, is pivotally connected to the seat 112. The inner screw hole 111 is extended toward the joint end 1131 from a terminal surface 1132s of the screw end 1132. Since the inner screw hole 111 is exposed from the terminal surface 1132s of the screw end 1132, such that the fasten element 130 can enter the inner screw hole 111 from the terminal surface 1132s. In another embodiment, the joint end 1131 can be realized by a cylinder joint.

The casing 120 has a through hole 121 and comprises a lateral plate 122 and a protrusive pillar 123. The protrusive pillar 123 is disposed on an outer surface 122s1 of the lateral plate 122, and the through hole 121 is extended to the lateral plate 122 from the terminal surface 123s, so as to penetrate the whole thickness of the casing 120. In the present embodiment, the through hole 121 does not have any thread, and the screw end 1132 can enter the through hole 121 by such a way of moving along a straight direction but not rotating. In another embodiment. The screw end 1132 can enter the through hole 121 by such a way of moving along a straight direction and rotating. In addition, the screw end 1132 can be fixed to the through hole 121 by gluing or interference fit. In another embodiment, the screw end 1132 can be disposed within the through hole 121 by clearance fit, and a relative position between the casing 120 and the base 110 can be fixed by the fasten element 130 passing through the through hole 121 to being screwed to the inner screw hole 111 of the base 110. In the present embodiment, since the screw end 1132 can enter the through hole 121 by a way of moving along a straight direction but not rotating, the required time of the screw end 1132 entering the through hole 121 can be reduced, and thus reduces the required assembling time of the base 110 assembling to the casing 120.

After the screw end 1132 enters the through hole 121, the fasten element 130 is screwed to the screw end 1132, such that the casing 120 is fixed to the base 110. During the casing 120 being screwed to the base 110, just one-time working procedure is performed, such that the required assembling time of the base 110 assembling to the casing 120 can be reduced. However, the number of screwing times of the present embodiment is not meant to be for limiting.

The fasten element 130 is flat-head screw, for example, or other element having male thread. The fasten element 130 comprises a male thread rod 131 and a head 132, wherein the head 132 is connected to the male thread rod 131. The head 132 is substantially aligned with the inner surface 122s2 of the casing 120 or is recessed with respect to the inner surface 122s2 of the casing 120, such that the head 132 is not projected from the inner surface 122s2, and thus the head 132 can be avoided interfering with an element disposed within the casing 120. In another embodiment, if there is no interfering problem or other problem, the head 132 can be projected from the inner surface 122s2 of the casing 120. The shape of the head 132 can be a circular shape, an elliptic shape or polygonal shape such as a quadrilateral shape, a pentagonal shape, a hexagonal shape or other polygonal shape.

The casing 120 has an indentation 124. An inner diameter D1 of the indentation 124 is larger than an inner diameter D2 of the inner screw hole 111, such that the head 132 of the fasten element 130 tightly press on the casing 120 and is received within the indentation 124 after the fasten element 130 passes through the through hole 121 to be screwed to the inner screw hole 111 of the base 110. As a result, the head 132 is not projected from the inner surface 122s2, and thus the head 132 is avoided interfering with an element disposed within the casing 120. In the present embodiment, the inner diameter D1 of the indentation 124 is getting narrower toward the inner surface 122s2 from the outer surface 122s1; however, such embodiment is not meant to be for limiting.

Figure 2:
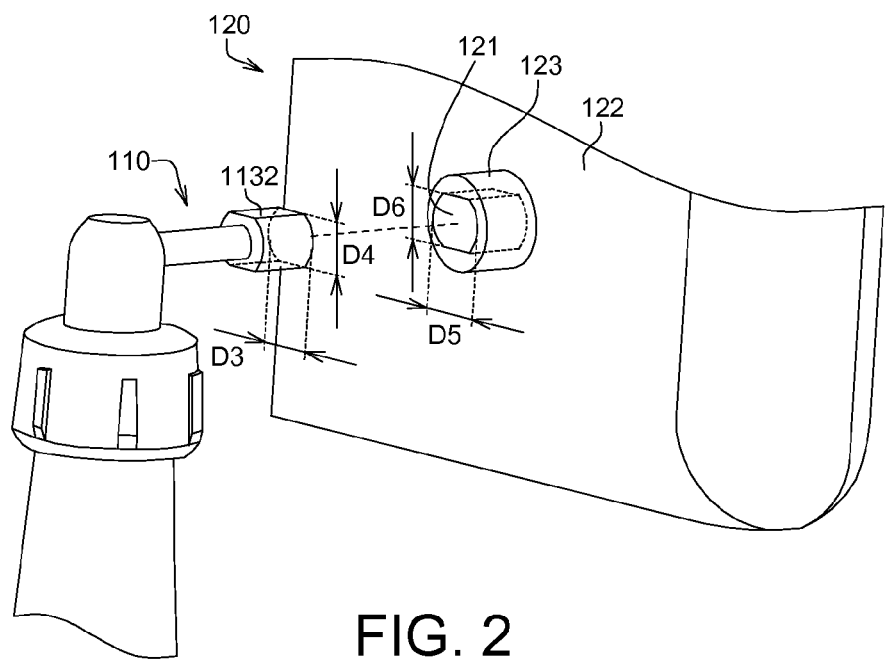
FIG. 2 illustrates a rear view of the network camera of FIG. 1.

Referring to FIG. 2, a rear view of the network camera of FIG. 1 is shown. The screw end 1132 of the joint rod 113 has a first large diameter D3 and a first small diameter D4, and the through hole 121 has a second large diameter D5 and a second small diameter D6. In one embodiment, the screw end 1132 is an elliptic pillar, an elliptic ball, a polygonal pillar or other appropriate structure. The screw end 1132 of the joint rod 113 is disposed within the through hole 121 in such way of the first large diameter D3 being aligned with the second large diameter D5 of the through hole 121 and the first small diameter D4 being aligned with the second small diameter D6 of the through hole 121, as shown in FIG. 3.

Figure 3:
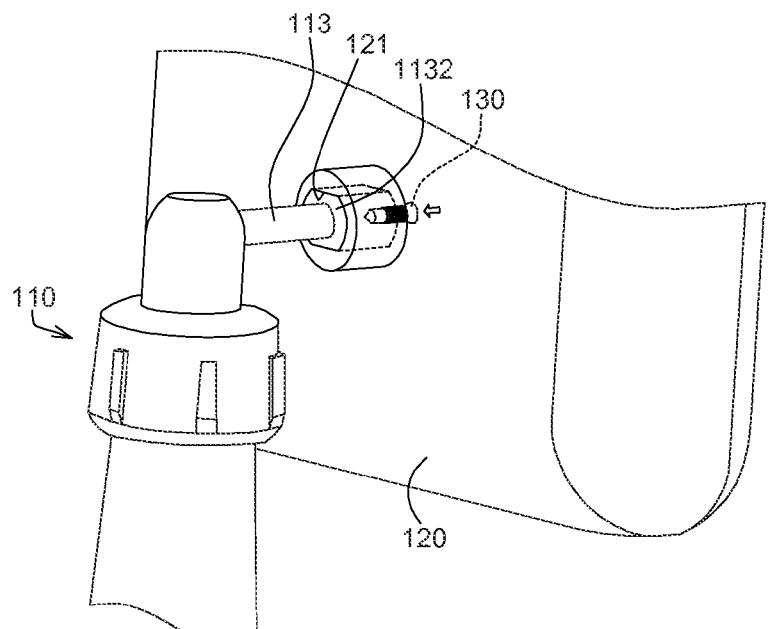
FIG. 3 illustrates a view of the screw end of FIG. 2 being inserted into the through hole of the casing.

Referring to FIG. 3, a view of the screw end of FIG. 2 being inserted into the through hole of the casing is shown. While the fasten element 130 is rotationally screwed to the inner screw hole 111, since the size of the diameter of the screw end 1132 matches the diameter of the through hole 121, the screw end 1132 is restricted within the through hole 121 to avoid being rotated by the fasten element 130. As a result, the fasten element 130 is successfully screwed to the screw end 1132 to ensure that the fasten element 130 fixes a relative position between the casing 120 and the screw end 1132.

In another embodiment, the screw end 1132 is a cylinder, such as an isodiametric cylinder. The through hole 121 is a corresponding circular hole.

Figure 4:
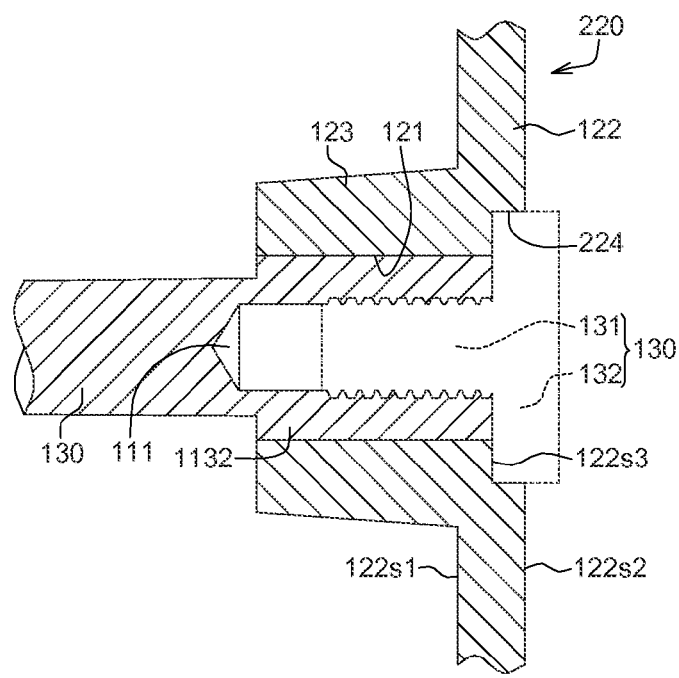
FIG. 4 illustrates a cross-sectional view of a casing and a fasten element according to another embodiment of the invention.

Referring to FIG. 4, a cross-sectional view of a casing and a fasten element according to another embodiment of the invention is illustrated. In comparison with the casing 120 of FIG. 2, the casing 120 of the present embodiment has a first inner surface 122s2 and a second inner surface 122s3, and the second inner surface 122s3 is recessed with respect to the first inner surface 122s2 to form an indentation 124. The inner diameter of the indentation 124 is larger than an inner diameter of the through hole 121. The first inner surface 122s2 and the second inner surface 122s3 face an identical direction. The head 132 of the fasten element 130 leans against the second inner surface 122s3, and is projected from the first inner surface 122s2. In another embodiment, the head 132 is recessed with respect to the first inner surface 122s2 of the casing 120 or substantially aligned with the first inner surface 122s2.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network camera, comprising:
   a base having a screw hole, wherein the screw hole is a blind hole;
   a casing having a through hole;
   a fasten element passing through the through hole from inside the casing and fastened within the screw hole, so as to assemble the base to the casing;
   an image capture element; and
   a printed circuit board (PCB) disposed within the casing for controlling the image capture element.

2. The network camera according to claim 1, wherein the base comprises:
   a base body; and
   a joint rod having a joint end and a screw end, wherein the joint end is pivotally connected to the base body, and the screw hole extends from a terminal surface of the screw end into the screw end.

3. The network camera according to claim 2, wherein the joint rod is a universal joint.

4. The network camera according to claim 2, wherein the joint end is a ball joint.

5. The network camera according to claim 2, wherein the screw end has a first large diameter and a first small diameter, and the through hole has a second large diameter and a second small diameter; the screw end is disposed within the through hole in such way of the first large diameter being aligned with the second large diameter of the through hole and the first small diameter being aligned with the second small diameter of the through hole.

6. The network camera according to claim 1, wherein the casing has an indentation, the indentation and the through hole are interconnected, and an inner diameter of the indentation is larger than an inner diameter of the screw hole.

7. The network camera according to claim 6, wherein the fasten element comprising:
   a male thread rod; and
   a head connected to the male thread rod and located within the indentation.

8. The network camera according to claim 1, wherein the fasten element is a flat-head screw.

9. The network camera according to claim 1, wherein the casing has an inner surface, and the fasten element comprises:
   a male thread rod; and
   a head connected to the male thread rod and substantial aligned with the inner surface of the casing.

10. The network camera according to claim 1, wherein the casing has an inner surface, and the fasten element comprises:
    a male thread rod; and
    a head connected to the male thread rod and recessed with respect to the inner surface of the casing.

11. The network camera according to claim 1, wherein the fasten element comprises:
    a male thread rod; and
    a head connected to the male thread rod and projected from an inner surface of the casing.

12. The network camera according to claim 1, wherein the casing comprises:
    a lateral plate; and
    a protrusive pillar disposed on an outer surface of the lateral plate, wherein the through hole penetrates to an inner surface of the lateral plate from a terminal surface of the lateral plate.

13. The network camera according to claim 1, wherein the casing has a first inner surface and a second inner surface, the second inner surface is recessed with respect to the first inner surface to form an indentation, and the through hole extends to the second inner surface.

14. The network camera according to claim 13, wherein an inner diameter of the indentation is larger than an inner diameter of the through hole, the first inner surface and the second inner surface substantially face the same direction, and the fasten element leans against the second inner surface.

15. The network camera according to claim 1, wherein the base is detachably assembled to the casing through the fasten element.

\* \* \* \* \*